US007937326B1

United States Patent
Thaxton

(10) Patent No.: US 7,937,326 B1
(45) Date of Patent: May 3, 2011

(54) DOCUMENT SECURITY PROTECTION ANALYSIS ASSISTANT

(75) Inventor: Dan Thaxton, New Lebanon, OH (US)

(73) Assignee: The Standard Register Company, Dayton, OH (US)

( * ) Notice: Subject to any disclaimer, the term of this patent is extended or adjusted under 35 U.S.C. 154(b) by 2809 days.

(21) Appl. No.: 10/079,679

(22) Filed: Feb. 20, 2002

(51) Int. Cl.
*G06F 21/00* (2006.01)

(52) U.S. Cl. ........... 705/57; 705/51; 705/59; 705/79; 713/152; 713/165; 713/200; 713/201; 380/52; 380/202; 380/241

(58) Field of Classification Search .......... 705/57, 705/64–79, 35–44, 51, 59; 235/380; 713/152, 713/165, 200, 201; 380/52, 202, 241
See application file for complete search history.

(56) References Cited

U.S. PATENT DOCUMENTS

| | | | |
|---|---|---|---|
| 4,228,348 A * | 10/1980 | Lee | 235/449 |
| 5,449,200 A * | 9/1995 | Andric et al. | 283/67 |
| 5,523,942 A | 6/1996 | Tyler et al. | |
| 5,530,900 A | 6/1996 | Sterling | |
| 5,615,342 A | 3/1997 | Johnson | |
| 5,740,425 A | 4/1998 | Povilus | |
| 5,924,737 A * | 7/1999 | Schrupp | 283/58 |
| 5,963,910 A | 10/1999 | Ulwick | |
| 6,008,817 A | 12/1999 | Gilmore, Jr. | |
| 6,115,691 A | 9/2000 | Ulwick | |
| 6,631,473 B2 * | 10/2003 | Townsend | 726/25 |
| 6,714,288 B2 * | 3/2004 | Cohen | 356/71 |
| 6,885,748 B1 * | 4/2005 | Wang | 380/201 |
| 6,957,193 B2 * | 10/2005 | Stefik et al. | 705/51 |
| 6,970,573 B2 * | 11/2005 | Carr et al. | 382/100 |
| 7,080,041 B2 * | 7/2006 | Nagel | 705/51 |
| 7,143,290 B1 * | 11/2006 | Ginter et al. | 713/176 |
| 7,152,047 B1 * | 12/2006 | Nagel | 705/76 |
| 7,305,104 B2 * | 12/2007 | Carr et al. | 382/100 |
| 7,346,184 B1 * | 3/2008 | Carr et al. | 382/100 |
| 2001/0037309 A1 * | 11/2001 | Vrain | 705/64 |
| 2002/0080996 A1 * | 6/2002 | Rhoads | 382/100 |
| 2003/0117262 A1 * | 6/2003 | Anderegg et al. | 340/5.53 |
| 2003/0145208 A1 * | 7/2003 | Willins et al. | 713/176 |
| 2003/0231785 A1 * | 12/2003 | Rhoads et al. | 382/100 |

* cited by examiner

*Primary Examiner* — Pierre Eddy Elisca
*Assistant Examiner* — Shahid Kamal
(74) *Attorney, Agent, or Firm* — Dinsmore & Shohl LLP

(57) ABSTRACT

A computer-based process for product selection optimization by displaying various security features available for a security document, for evaluating the impact that the selection of one security feature has upon the selection of other features, and for optimizing the selection of each security feature or a combination of features in meeting a protection goal for the security document.

20 Claims, 13 Drawing Sheets

28

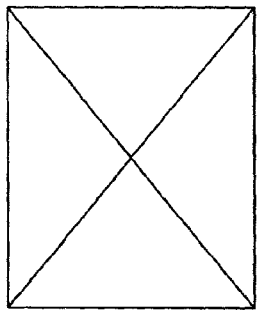

26
Thermochromic Ink
Home    Overt Authentication

Ink that changes color or disappears when warmed and returns } 29
back to the original color upon cooling.

Alias:
Mood Ink

Strengths:
This feature provides a good level of protection against copy and counterfeit and can be easily authenticated in the field without special equipment.

Liabilities:
Limited lightfastness if exposed to direct sunlight or extended fluorescent office lighting.
Susceptible to strong solvents and abrasion.

Unique Considerations:
Laser fusers have no permanent impact upon feature performance.
Total life expectancy has not yet been established, but infrequently handled documents under limited exposure to ambient light are anticipated to function in excess of seven years.
Thermochromic inks should be printed over plain paper backgrounds, not other colors.
Additional colors and temperature ranges are available.
Additional information can be found in Engineering Technical Bulletin TBS#8354 on the Knowledge Web.

How to Order:
Thermochromic Ink can be ordered through the home plant.

☐ Form Design Questions : Form

☐ Will this document be used on a laser printer?
☐ Will this be a cut sheet?
☐ Is this an image Seal form?
☐ Is the purchase cost more important than the potential fraud losses prevented?
☐ Is it a problem if this item is copied?
☑ Is your organization currently experiencing fraud losses from copies?
☑ Is it a problem if the information on printed on this item is altered?
☑ Is your organization currently experiencing fraud losses from alterations?
☑ Will the acceptors of this document be trained to recognize its appearance?
☐ Will every item be tracked and accounted for?
☐ Will you be using a computerized authentication system like Positive Pay or a database lookup?
☐ will this material be stored in a secure manner?
☐ Will this material be shipped in a secured manner?

☐ Pantograph Selection : Form

A pantograph is a screened background pattern on the face of the document. Only one pantograph may be selected at a time. Void Pantographs like Copyban and Super Safety are special patterns with hidden "VOID" messages that become visible when copied.

☑ Copyban Capture
The best copy protection available in a VOID pantograph. Copyban Captures gradient (dark to light) screens thwart attempts to adjust color copiers to inhibit appearance of the VOID word...

☐ Copyban Plus
Another patented Standard Register technology...

☐ Super Safety (VOID)
Super Safety (often referred to as "VOID" Pantograph) is one of Standard Register's first patented security technologies...

☐ Standard Pantograph
Standard pantographs do not include a hidden "VOID" message and offer no significant protection against color copies...

☐ None of the Above
No pantograph is desired

FIG. 8B

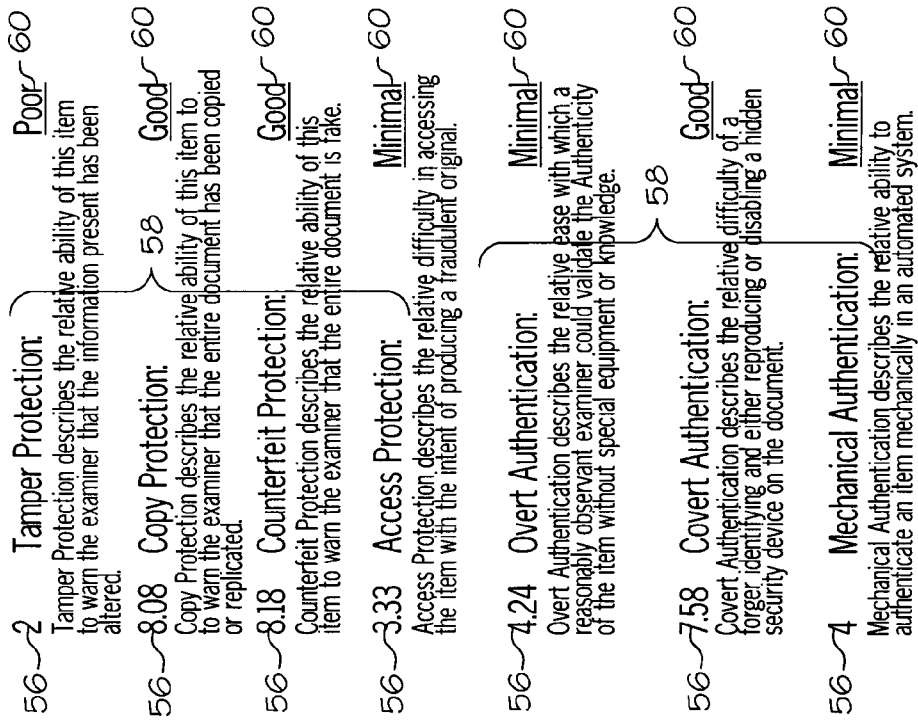
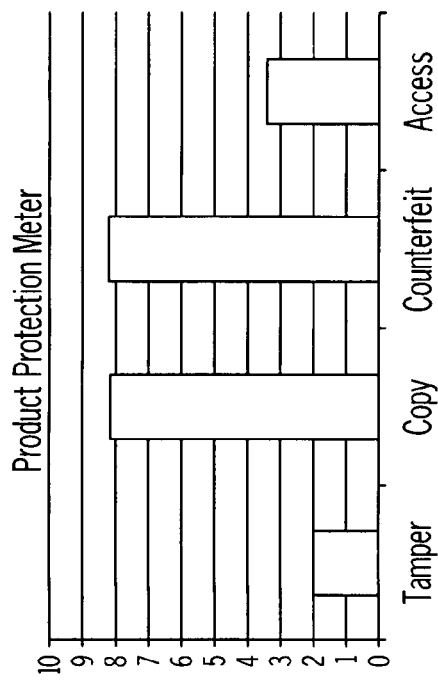
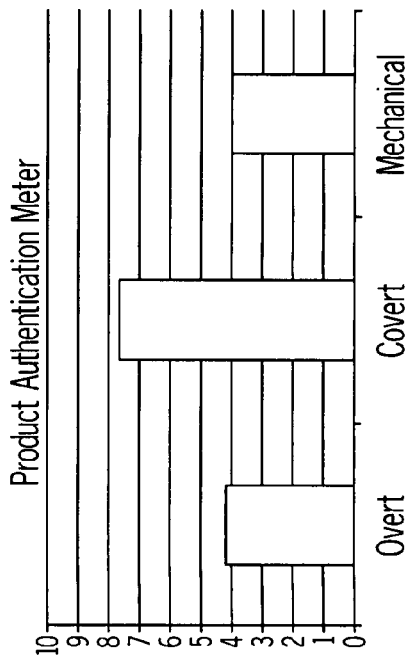
FIG. 9A

These are the Security products selected for this review

| | |
|---|---|
| Artificial Watermark | Imagery printed on the document in white or transparent non-penetrating ink which is visible when viewed at an angle. May optionally fluoresce green under black light. |
| Consecutive Number | A sequential control or reference ID number printed on the document to aid in determining when & where it was issued |
| Defaced Voucher | Background printing across otherwise blank areas of the document intended to prohibit use of the voucher to create a counterfeit. |
| Dual Image Numbering | A consecutive number printed in two colors, one of which penetrates into the paper and is visible on the back of the sheet. |
| Fluorescent Ink | Images and words printed on the document that are difficult to see unless exposed under a black light. |
| Hidden Message Border | A word of phrase hidden within a High Resolution border and requiring a special lens to authenticate. |
| High Resolution Border | Intricate line patterns that emulate Intaglio printing. These borders enhance the appearance of a document and make replication difficult. |
| Microdots | A series of small circles of differing dot sizes that are very difficult to reproduce. |
| Microprint | A line of very fine text that appears as a solid or dashed line until viewed under magnification. |
| Pantograph (CB Capture | Darker and lighter gradually changing tones that provide excellent color copy protection against the full range of copier settings. The word "VOID" appears on most color copies made. |
| Satellite Image | A covert image hidden in the Copyban Capture pantograph that requires a special lens to view on the original document but becomes visible on a color copy. |

☐ Protection Disclaimer : Form

One or more of the scores provided by this report have identified a deficiency in a specific level of protection. While "perfect" document protection is seldom possible under any circumstances, this item is clearly vulnerable to attack and fraud in the manner noted. Unless corrected, the security features currently selected will be unable to provide your document with adequate protection and performance in the specified area.

Please take a moment to re-examine the levels of protection currently selected and consider improving those categories offering minimal or poor levels of performance.

<u>Problem Area:</u>
Tamper Protection — 64

<u>Features that can help resolve this deficiency include</u>

Tamper Evident Coating — A tamper evident coating that displays a "void" word in three languages when activated by chemicals intended to remove the image.

Laid Lines — Spaced lines that make alterations by cutting and pasting easier to detect. Green Laid Lines are recommended for best performance.

DOCUMENT SECURITY PROTECTION ANALYSIS ASSISTANT

BACKGROUND OF THE INVENTION

The present invention relates to computer-based processes, and in particularly to a system for presenting a user with a comprehensive set of security features and for assisting the user through any potential incompatibilities and/or nuances associated with selected security features in order to meet a protection goal of the user for a security document.

Security features improve customer satisfaction and allow for relatively unique product designs. Examples of such security features include, but not limited to, pantographs, screens, tamper protection, flourishes, overt authentication, covert authentication, and packaged products. In some cases, however, these features may be undesirable or even incompatible with other features. As the number of security features increases and the interplay between these features grows, selecting from among these features becomes more difficult.

Computer implemented design systems for various products are shown in a number of patents. For example, Tyler et al U.S. Pat. No. 5,523,942 discloses a computer implemented graphical user interface for receiving instructions and information relating to insurance products, and for displaying insurance proposals relating thereto. The graphical user interface has a product design section for receiving information specifying an insurance product and components. The product design section has a design grid that is a matrix, enabling input of product information, premium information and dividend information relating to a selected insurance product. The design grid enables a user to select a solve procedure and variable as the subject of the selected solve procedure. The Tyler patent does not teach a system in which effectiveness is gauged.

Ulwick U.S. Pat. No. 6,115,691 and Ulwick U.S. Pat. No. 5,963,910 disclose a computer-based system for use in evaluating and optimizing the design of a product. The system includes a series of metrics which quantify customer satisfaction with the product in a number of areas, and permit the evaluation of a number of features and the impact which they have on customer satisfaction.

Gilmore U.S. Pat. No. 6,008,817 discloses a computer-based comparative visual assessment system, which assigns a plurality of weights to a corresponding plurality of components representing a subject, and assigns a plurality of scores to the corresponding plurality of components representing the subject. The system further determines a functional score for each of the plurality of components, determines an angle to be used for an output to the output device of a vector for each of the plurality of components, assigns the functional score to a length of the vector for each of the plurality of components, and displays the vector on the output device.

What is not shown or suggested in any of the prior-art references is a computer-based system that permits product design by selection of design features, and an assessment of how well the designed product including those design features achieves predetermined goals.

SUMMARY OF THE INVENTION

The present invention is a computer-based process that optimizes product selection by displaying various user-selectable features, evaluating the impact that each selected feature has upon the selection of other features, and suggesting choices to optimize the selection of each feature and/or a combination of features to meet a goal of a user for the product.

In one aspect, the present invention comprises a software application readable on a compatible computer system comprising a processor, memory, and a user interface. When running the software application, the system is programmed to present the user with a set of product choices and, depending upon the choices selected, to point out any potential incompatibilities associated with those selections. In those circumstances, the system recommends a course of action, which will resolve the incompatibility issues or concerns. Finally, the system displays an assessment of how well the selected features will address the desired goal of the user for the product. It is to be appreciated that the system incorporates a library or database of information recording the relative pros and cons of each security feature for various objectives (e.g., security), and computes a weighted average of the selected security features in order to determine the above-mentioned assessment.

In another aspect, the present invention is used to optimize security features in order to meet a security and/or performance goal of a user for the security document. In this computer-based application, various user-selectable security features for a security document are presented on a computer display to a user for selection. Information about individual features may be view by clicking on the feature name, which will open a dialog box providing what the feature does along with the relative pros and cons for that feature.

The user makes feature selections by provided check boxes, radio buttons, drop down lists, and combinations thereof. Each security feature is associated with compatibility and relative rating information. When selected security features conflict or raise new questions about compatibility, the issue is presented to the user with a dialog box that requests a selection to resolve the issue. In some instances, there may not be a choice between features such as when the selection of one feature necessitates or precludes the selection of another feature. In such a case, the user is notified of this fact.

Once a set of features is selected and all conflicts are resolved, it is desirable to ascertain how successfully these features will work together to perform a specific security and/or performance goal. An assessment by which to ascertain success is obtained by calculating the sum of the relative ratings of the security features selected and presenting them to the user against a scale according to their influence on certain security and performance goals. The user can use this assessment to further revise and optimize the selection of security features in order to reach a desired protection goal for the security document.

In one embodiment of the present invention, presented is a computer-implemented method for optimizing security features designed to provide a level of security in a security document. The method comprises processing data relating to selected security features, the security features each having associated compatibility and relative rating information, and revising the selected security features to resolve any compatibility issues. The method further comprises evaluating the relative rating information of the selected security features to determine a document security rating, and presenting the document security rating.

In another embodiment of the present invention, provided is a computer-readable medium capable of instructing a processor of a computer system to perform optimization of security features designed to provide a level of security in a security document. The optimization is carried out by the steps of processing data relating to selected security features, the security features each having associated compatibility and relative rating information, and revising the selected security features to resolve any compatibility issues. The optimization further includes evaluating the relative rating information of the selected security features to determine a document security rating, and presenting the document security rating.

These and other features and objects of the present invention will be apparent in light of the description of the invention embodied herein.

BRIEF DESCRIPTION OF THE DRAWINGS

The present invention is illustrated by way of example and not limitation in the accompanying figures, in which like references indicate similar elements, and in which:

FIG. 5 is an illustration of an information sheet according to the present invention.

FIG. 7 is an illustration of a computer screen allowing a user to narrow down security product requirements according to the present invention.

FIG. 8a is an illustration of a computer screen allowing the user to select desired security product features according to the present invention.

FIG. 8b is an illustration of a computer screen allowing the user to improve various features by resolving potential conflicts and pointing out noted issues.

FIG. 9A and FIG. 9B, when assembled with FIG. 9A positioned above FIG. 9B, together form an illustration of a computer screen showing the user how successful these desired product feature work together to perform a specific goal or function.

FIG. 10 is an illustration of a computer screen showing the user areas identified as deficiency in a specific level of protection.

DETAILED DESCRIPTION OF THE PREFERRED EMBODIMENTS

The present invention is directed to a computer based software tool designed to present a user, such as a consultant and/or customer, with a comprehensive set of product choices, and depending on the choices selected, assist the user through any potential incompatibilities and/or nuances associated with those selections. The present invention provides on a computer screen/display a selection guide for the simple selection of desired security features for the design of a security document. After selection, the programmable computer examines those selected security features for possible incompatibilities and presents any potential problems to the user with a description of the concern. Additionally, the software application provides to the user a recommended course(s) of action to resolve the concern. Furthermore, the software application provides the user an assessment of how well the selected security features will address the desired goal of the user for the security document.

Figure 1:
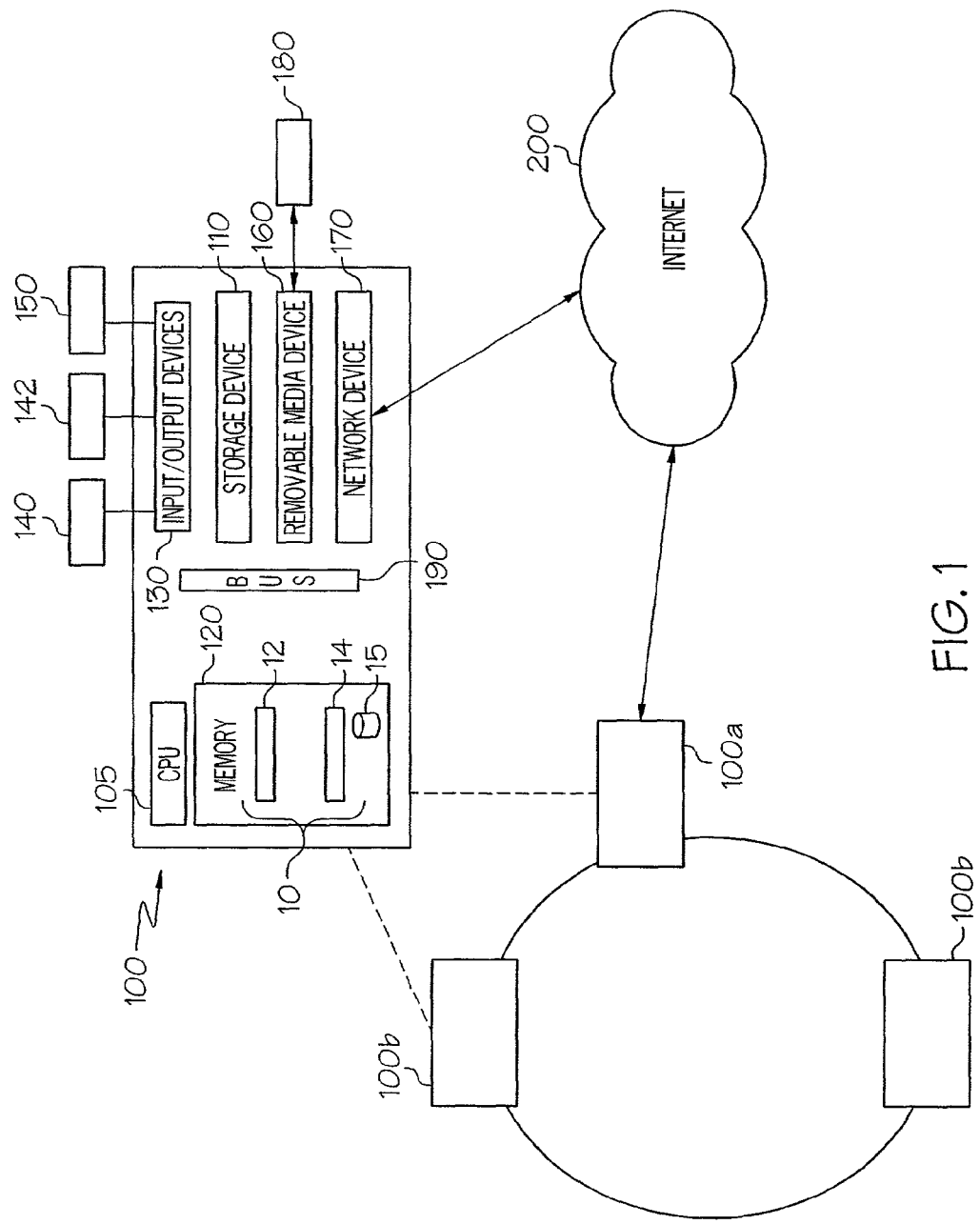
FIG. 1 is a block diagram of a conventional computing paradigm environment in which the present invention may be operated.

FIG. 1 is an illustration of a computer system 100 that may adequately run the software application, generally indicated by 10, that efficiently implements a process permitting the optimization of security features in achieving a desired goal for a security document. The computer system is conventional, and generally comprises a central processing unit (CPU) 105, mass storage 110 (e.g., hard disk drive), main memory 120, and an input/output (I/O) device 130. Connected to the I/O device 130 are peripheral devices comprising input devices, such as, for example, a keyboard 140 and mouse 142, and a display 150. The computer system further comprises one or more removable media storage devices 160, and a network device 170, such as a network interface card or modem. The elements of computer system are interconnected in the conventional manner, in which each component communicates with each other via one or more system busses 190.

The removable media storage device 160 can be used to install software products, including the software application of the present invention, that are provided on a computer-readable medium 180, such as a CD-ROM, diskette, flash memory, and the like. Alternatively, through the network device 170, the software application of the present invention may be loaded/updated electronically over a network 200, such as through the Internet, or from an electronic bulletin board. The network device 170 permits the computer system to communication with other computers or servers (100a, 100b, 100c) over the network.

It is also to be appreciated that the components of the document security protection analysis assistant software may be loaded and run from as single platform or from a number of networked intelligent platforms, such as for example a computer, laptops, personal digital assistant, web-enabled cellular phone, and the like as is known. Additionally, although the computer system is illustrated as a stand-alone computer in which the software and methods described below are executed mainly from within the computer system, other computing paradigms and architectures may be used. For example, the client-server paradigm in which some functions are executed on a client computer and others are executed on a server computer connected to the client computer via a network would also be suitable.

In the discussion to follow, the software components of document security protection analysis assistant software, which are principally relevant to the present invention, are shown for purposes of illustration as existing or residing in main memory 120. However, persons skilled in the art to which the invention relates, understand that software components are typically executed from such main memory and fetched into the main memory on an as-needed basis from other sources such as the mass memory or hard disk drive 110 or from over the network 200.

In addition, the computer system 100 includes a conventional operating system to facilitate the execution of such programs and other functions typically performed by operating systems. Accordingly, a user can configure, initiate, and control the execution of the software application 10 of the present invention on the computer system 100 in the conventional manner. Instructional materials and operational manuals may be provided to assist the user during installation and use. Once installed, the software application 10 of the present invention is booted-up by execution of the appropriate commands. It is to be appreciated that the process of the present invention is hardware and code independent, and is illustrated therefore hereafter in exemplary computer screen depictions to provide a full understanding of the invention.

Once the software application 10 is loaded and running in main memory 120, a document security protection analysis assistant designed to assist a user in understanding, designing, and/or recommending security features for a security document is provided. In the illustrative embodiment, the application 10 is implementing using Microsoft® Access, however, other database applications and/or programming languages such as, and not limited to, Visual Basic, C++, and XML (for web implementation) may be used.

The software application 10 includes two functionally different components: input forms 12 and an event handler 14. The input forms 12 accepts user inputs, such as, document security features used in evaluating specific user document security requests, and carries out actions based on user inputs, such as storing/retrieving information from a database record in a database 15. The event handler 14 includes the necessary routines for accessing the inputted/stored data, for conducting the mathematics and matrix analysis on selected security features, and for providing the assessment of the selected security features meeting a desired level of protection and function for the security document in a number of areas of concern, such as for example, attack resistance and authentication.

Figure 2:
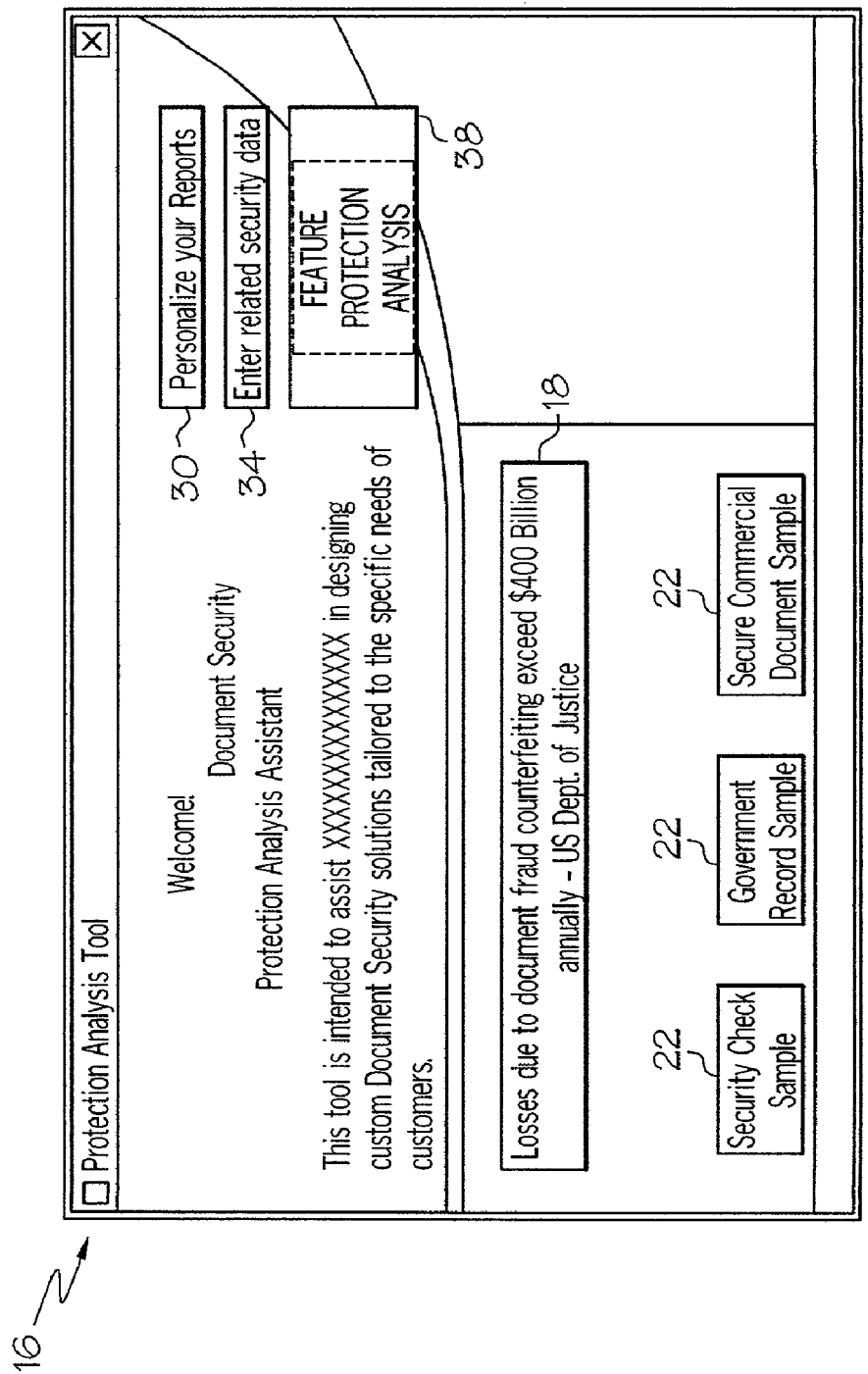
FIG. 2 is an illustration of a computer screen introducing a user to the features of the present inventions and for allowing the user to customize entry data.

After launching the software application 10, an introduction form, generally indicated in FIG. 2 by reference symbol 16, allows the user to select among a number of specific subjects to assist in designing custom security documents tailored to meet specific needs of customers. For example, to familiarize the user with the need of providing security to sensitive security documents, such as for example checks, government records, and secure commercial documents, an overview in the form of a multimedia presentation may be selected for viewing from the introduction form 16. This multimedia presentation may be viewed, for example, by selecting a background button 18 using an input device such as the computer keyboard 140 or mouse 142, and the like.

Figure 3:
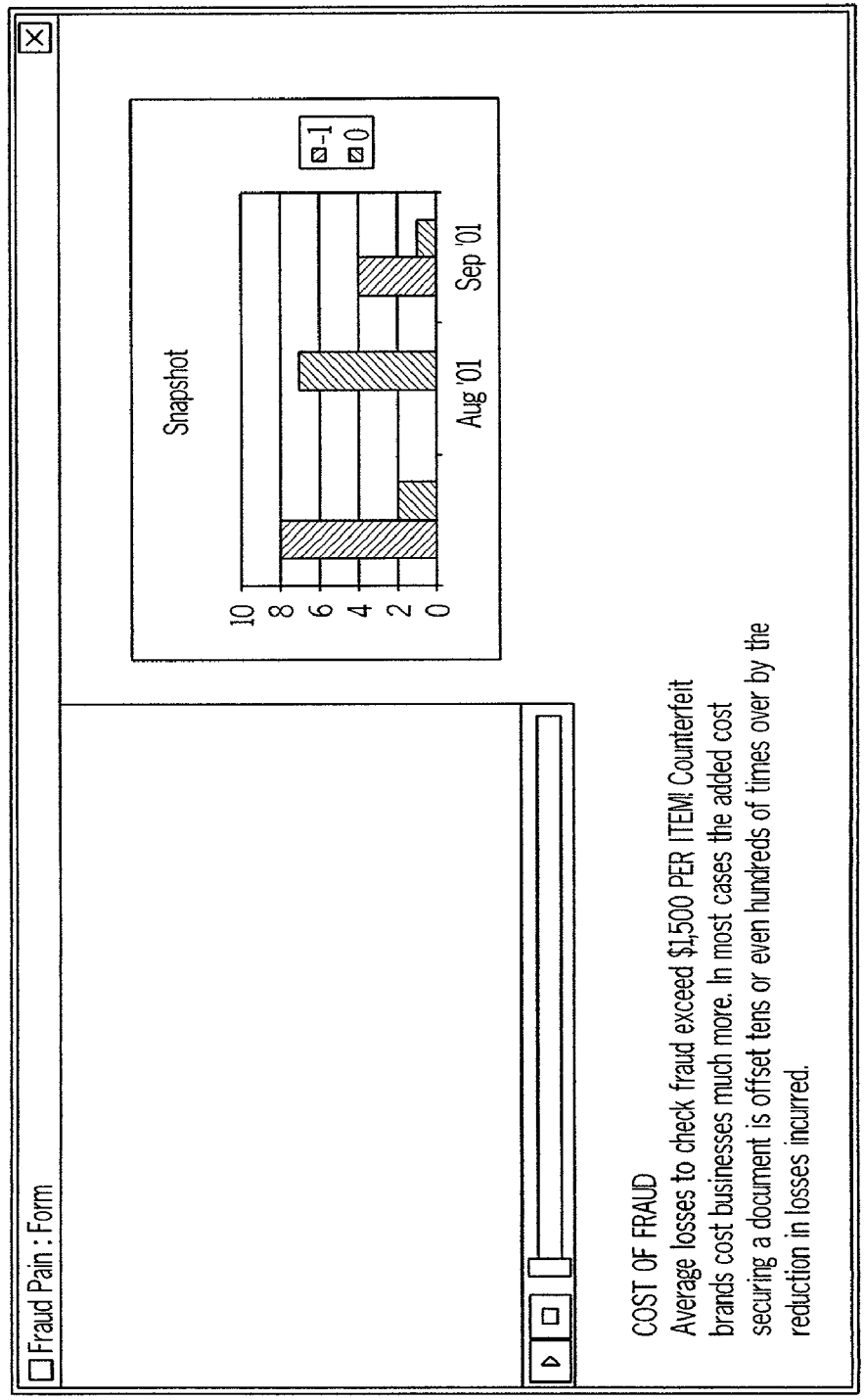
FIG. 3 is an illustration of a computer screen presenting information to user requesting information.

The multimedia presentation, generally depicted in FIG. 3 by reference symbol 20, may include text, video, animation, sound, graphics, and any combination thereof. Additionally, if the user is unfamiliar with such security documents, examples may be selected for viewing by selecting one of the security document sample buttons 22 provided on the introduction form 16 (FIG. 2). Selecting one of the sample buttons 22 will present to the user a graphical illustration of the selected security document type.

Figure 4:
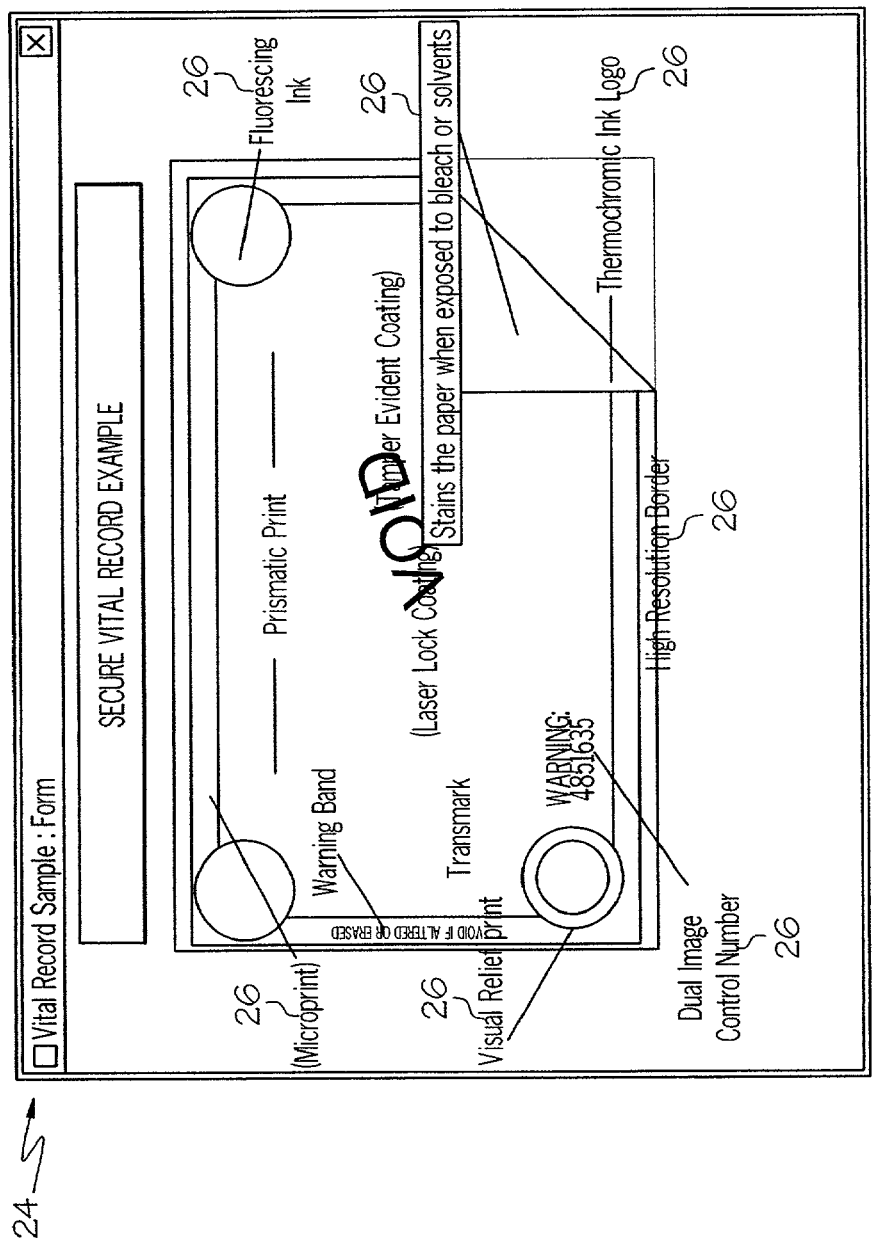
FIG. 4 is an illustration of a computer screen presenting a secure vital record example.

One example of such a graphical illustration for a security document is generally depicted in FIG. 4 by reference symbol 24. Other types of security documents may be similarly illustrated, such as for example, a check, a vital record, a certificate of origin, a title, a gift certificate, a prescription, a ticket, a label, a transcript/letterhead, or any other document where security features are useful. In the illustrated example, typical security features 26 that are associated with the displayed security document are indicated. Selecting the name of any one of the displayed security features 26 will present an information screen to the user. An example of such an information screen is generally depicted in FIG. 5 by reference symbol 28, wherein information 29 such as the function, purpose, strengths, weaknesses, and unique considerations of the selected security feature 26 is provided.

Figure 6:
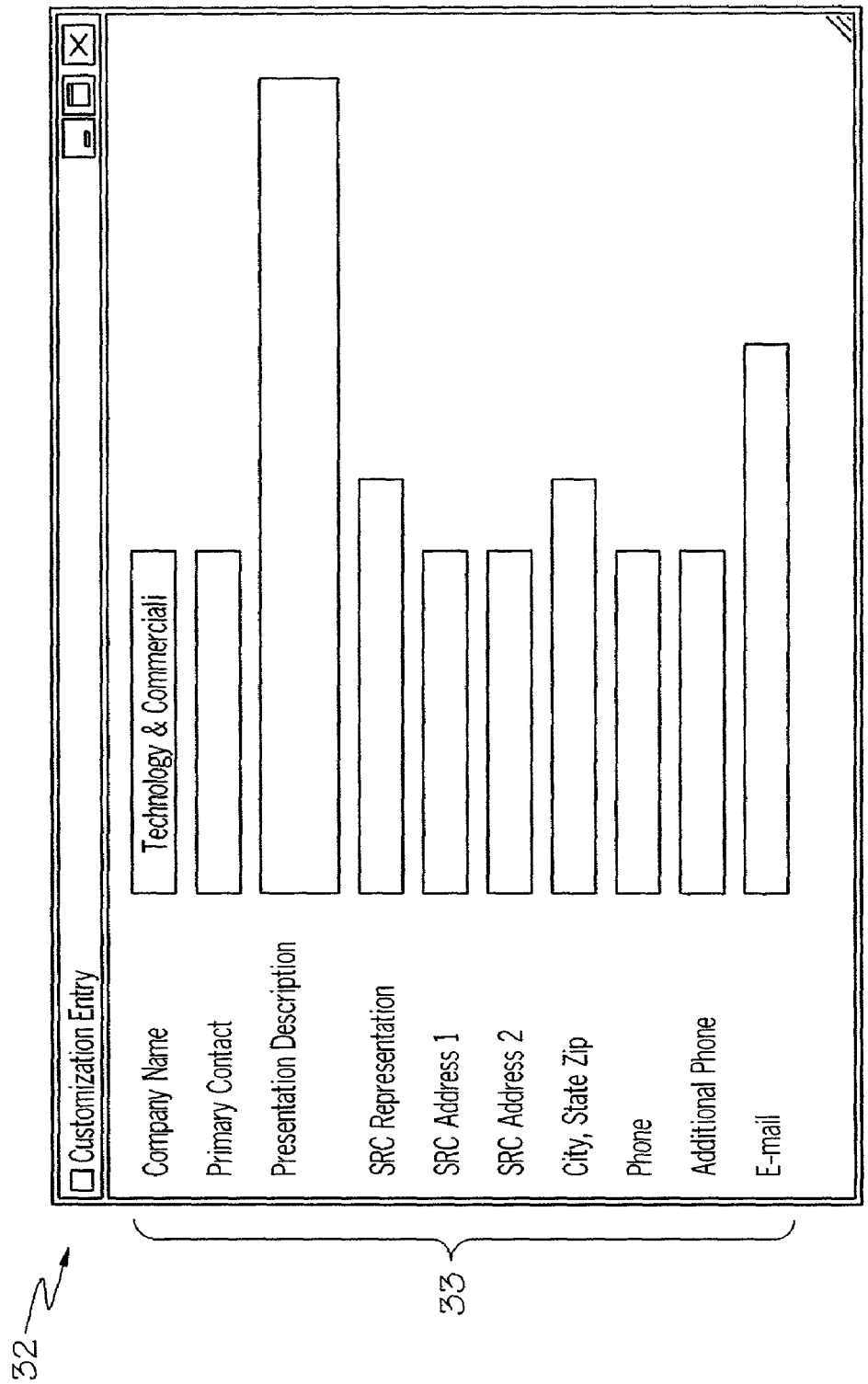
FIG. 6 is an illustration of a computer screen allowing a user to enter customer information.

Referring again to FIG. 2, from the introduction form 16 the user may customize the reports generated by selecting a personalization button 30. Selecting the personalization button 30 will provide the user with a customization entry form, generally depicted in FIG. 6 by reference symbol 32. Entering such information results in the reports generated by the software application 10 to contain customized user information 33. As illustrated by FIG. 6, the customizable user information 33 includes contact and representative information, which is a useful feature for users discussing and developing a number of security document options for a customer.

Additionally, if desired, the user can enter related security data by selecting the related security data button 34 from the introduction screen 16 (FIG. 2). In designing a security document, it is important to understand how the security document will be used and stored, and the type of printer it will be run on. Selecting the related security data button 34 will provide the user with a design questions form, generally depicted in FIG. 7 by reference symbol 36. On the design questions form 36, the user selects questions 37 that relate to the intended security document. As illustrated, these relational questions 37 reflect the general design of the document (cut sheet, laser printable, seal type, copyable, etc.), the environment of use (alterations, user expertise, how stored, tracking, authentication, etc.), and other factors relevant to the user (cost, current losses to fraud, etc.). Answering such related security questions 37 provides document design information that enables the software application 10 to provide a more accurate assessment of security by taking into account the identified conditions that affects the security features selected for use with the intended security document. Additionally, with the above-mentioned document design information, the application can provide better suggestions to resolve any potential issues. For example, LASER LOCK® will only be recommended in cases where the form will be used on a laser printer.

To start the security document analysis the user selects a feature protection analysis button 38 from the introduction form 16 (FIG. 2). Selecting the protection analysis button 38 will present to the user a feature selection form, generally depicted in FIG. 8a by reference symbol 40, from which the user selects the type of security document 42 and its associated security features 26. In the illustrative embodiment, the security features 26 are categorized by their purpose, wherein such categories 44 include pantographs/screens, tamper protection, overt authentication, covert authentication, and flourishes/premiums. The security document types 42 selectable from the selection form 40 include, for example, check, vital record, certificate of origin, title, gift certificate, prescription, ticket, label, transcript/letterhead, and other unspecified documents. A sample of a selected document type 42 may be viewed by clicking on the provided sample button 22. As before, clicking on the sample button 22 will bring up a sample screen 24 (FIG. 4) for the selected document type 42.

From the feature selection form 40, the user may also enter the related security data by selecting the provided security data button 34. Further, the software application 10 allows for a plurality of security document feature settings to be stored in the database 15. If the user desires to recall a saved setting, a drop-down box 46 provides a recall settings list of such saved settings from which the user may choose. The user adds to the stored settings by selecting a save settings button 48, which will record the currently selected information on the feature selection form 40, such as for example, the document type 42, documents features 44, the related security data 34, and combinations thereof, to the database 15 (FIG. 1). Accordingly, the user can maintain a library in the database 15 of various security document feature-setting arrangements.

Figure 8A:
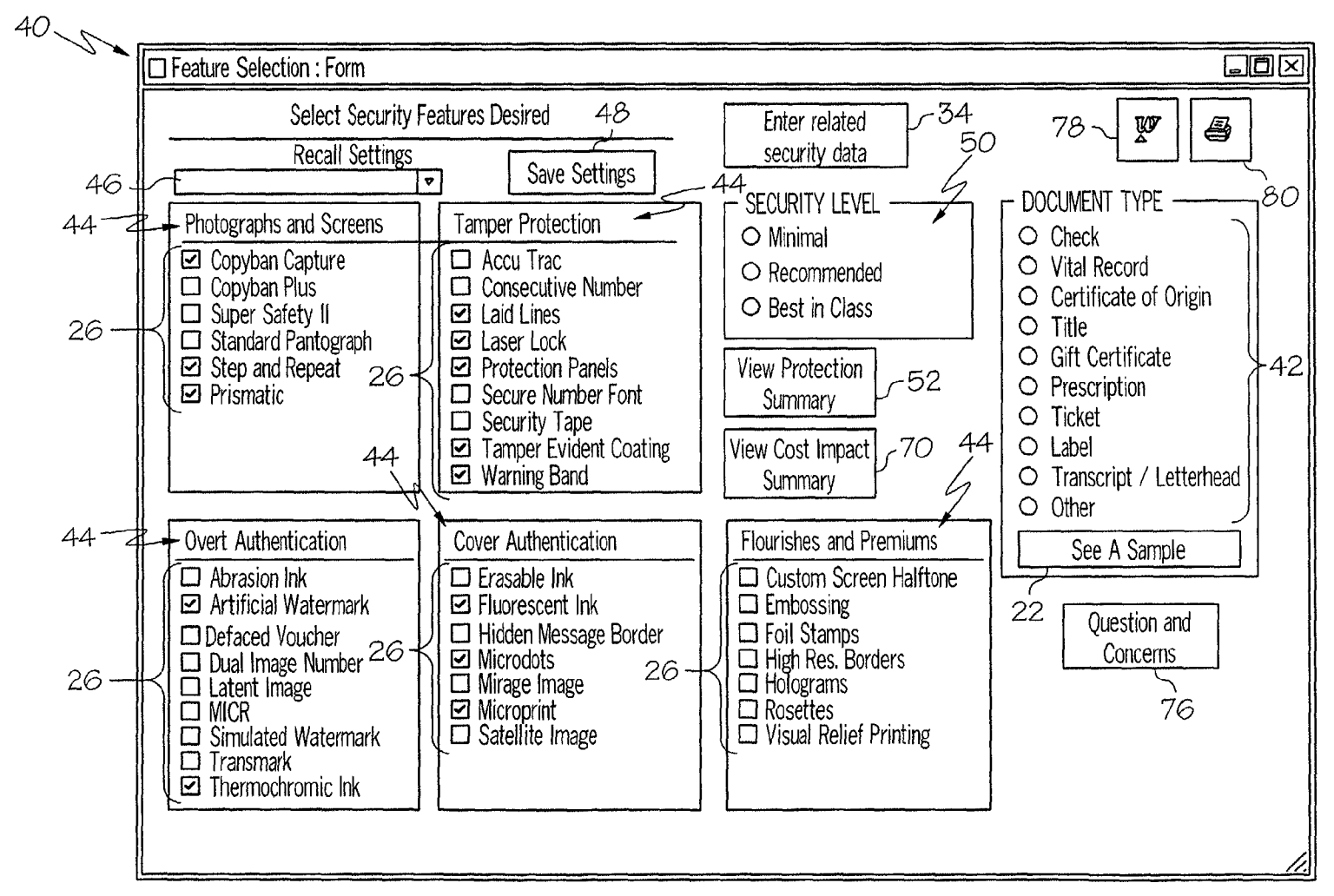

Referring to FIG. 8a, clicking on any one of the names of the security features 26 displayed on the feature selection form 40 will open an associated information screen 28 (FIG. 5) that describes the selected security feature in detail. It is to be appreciated that each security feature is associated with compatibility and relative rating information provided in a database record in the database 15. Such compatibility and relative rating information, along with the addition and deletion of security feature and document types, can be updated routinely through a network connection to a web site or server (not shown) providing such updates.

Other features of the software application include the ability to provide a selection recommendation of security features 26 necessary to achieve a desired security level. To use this option, the user simply selects the desired security level from a security level selection 50 and the document type 42. The software application 10 will then retrieve from the database 15, a stored security feature arrangement that pre-selects the security features 26 needed for achieving the selected level of protection for the selected document type. This automated selection process may also be updated routinely as new documents types and security features become available.

Because each security document feature 26 has associated with it compatibility information, in those circumstance when selected document features 26 raise compatibility issues with other selected or standard security features and/or desired security and performance goals, the issue is presented to the user with a resolution dialog box, generally depicted in FIG. 8b by reference symbol 49. As illustrated, the software application 10 presents to the user an explanation 51 for the conflict and provides a number of deciding security feature selections 53 which will resolve the compatibility issue or concern. In some cases, the user will have no choice in selecting between features such as when the selection of one item necessitates the selection of another feature. In such a case, the user is notified of this fact.

Once a set of security features 26 is selected on the feature selection form 40 and all conflicts have been resolved, it is desirable to ascertain how successfully these selected features will work together to perform a specific goal or function. The event handler 14 (FIG. 1) runs an assessment routine on the selected features 26 and document type 42 by selecting protection summary button 52. Once selected, the software application 10 returns a protection summary, generally depicted in FIG. 9A by reference symbol 54. As shown in the illustrated example, the protection summary 54 provides the user with an evaluation of how well these features protect the document against different forms of attacks, and provides an assessment on the relative ease of authenticating the security document.

It is to be appreciated that for each security feature, provided in the database 15 are relativistic values against tampering/alteration (tamper protection), copying/replication (copy protection), creating false originals (access protection), theft/unauthorized use (counterfeit protection), on the ease of authenticating the document at the point of acceptance (overt authentication), on the ability of hidden tools for identifying high quality counterfeits (covert authentication), on the ability to validate the document in an automated process (mechanical authentication), and on the impact of this feature on overall cost. These relative values are categorically summed, divided by a relative weight, and provided as a weighted average 56 in the protection summary under their associated protection and authentication assessment areas 58. As illustrated, the weight averages 56 can be graphically represented and/or provided with a general rating 60. Each general rating 60 is based upon the particular weighted average 56 exceeding a predetermined threshold heuristic value. As certain protection areas 58 become easier/harder to defeat, this heuristic value based on industry observations and norms may be changed accordingly. A selected feature list 61 of the security features selected and used to provide the resulting assessment is also provided by the protection summary 54.

With reference also to FIG. 10, if the software program 10 identifies a deficiency 64, such as for example, an area of the protection and authentication assessment 58 having a general rating 60 of "poor", it will post a warning that provides the cause for the deficiency. This warning is generally depicted in FIG. 10 by reference symbol 62, and unless corrected, the security features as currently selected, according to industry norms and assessment, will be unable to provide the document with adequate protection and performance in the specified protection and/or authentication area 58. Accordingly, the software program 10 will suggest to the user possible solutions 66 for correcting the indicated deficiency along with a brief description of each solution. The user can use the protection summary 54 to further revise and tailor the selection of security features 26, optimizing their selections in meeting a security and/or performance goal for the security document.

Figure 11:
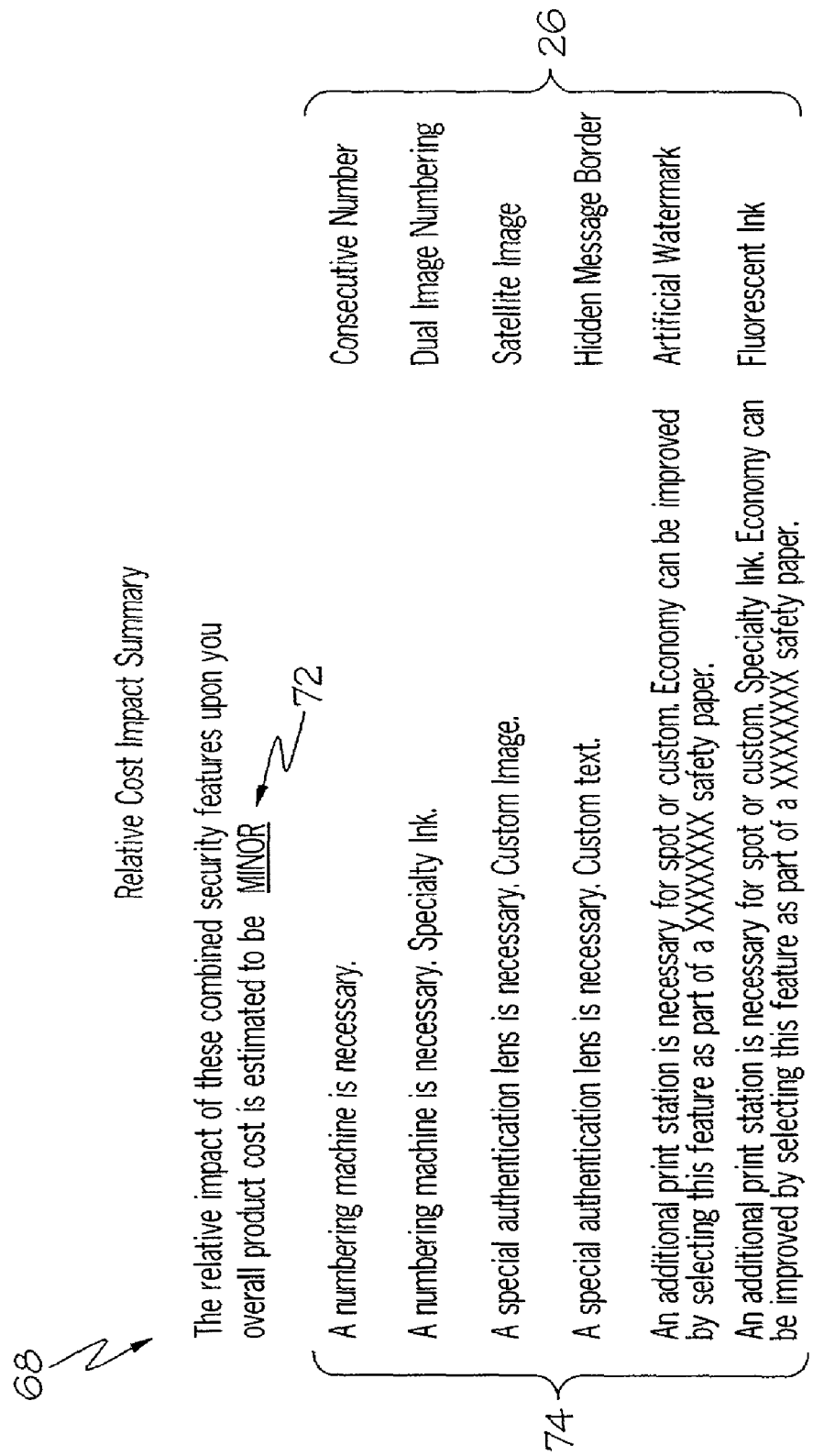
FIG. 11 is an illustration of a report that is provided to the user regarding the relative cost of the selected security features to implement according to the present invention.

After the user has identified all of the desired security features 26, a cost assessment, generally depicted in FIG. 11 by reference symbol 68, is viewed by selecting a cost impact summary button 70 provide on the feature selection form 40 (FIG. 8a). The cost impact summary 68 provides the user with an evaluation 72 of how the selected security features 26 affect the relative cost of the intended security document according to industry norms and assessment. It is to be appreciated that the relative cost impact summary 70 lists the evaluation 72, and the features 26 selected that may have additional support requirements 74, such as for example, special print units and/or other equipment/changes. Other remaining features of the software application 10 are explained hereafter.

Turning again back to FIG. 8a, the software application 10 enables the user to view frequently asked questions section and their teaching response by selecting a Q&A button 76 on the feature selection form 40. For example, such common concerns addressed may include cost, quantity of features needed, feature protection guarantees, chances of being defrauded, suitability of current designs, and other similar customer concerns. Additionally, once the features 26 and the security level 50 of the document have been decided, a report can be outputted, such as for example, to either a word processor application file or a local printer by clicking their associated buttons 78 and 80, respectively. The outputted report includes any customization data entered by the user into the database file 15 from the customization form 32 (FIG. 6). It is to be appreciated that an additional screen (not shown) controls the form layout, and the updating/editing of the displayed features and documents types. This screen also allows for the updating/editing of all preset data contained in the database file 15, and all the calculations/routines performed by the event handler 14. Therefore, if desired, the software application 10 may be customized advantageously to particular user needs, wherein the system may be used to provide feature selections, compatibility assessment and resolution, and effectiveness assessments in achieving a product goal(s) for other products.

In the foregoing specification, the invention has been described with reference to specific embodiments. However, one or ordinary skill in the art appreciates that various modifications and changes can be made without departing from the skill of the present invention as set forth in the claims below. Accordingly, the specification and figures are to be regarded in an illustrative rather than a restrictive sense, and all such modifications are intended to be included within the scope of the present invention.

What is claimed is:

1. A computer implemented method for evaluating document security features that provide a level of security in a security document, said security features being provided directly on said security document, and rating the security level of said security document, comprising:
   processing data relating to selected security features of said document using a computer, said security features each having associated compatibility and relative rating information;
   determining compatibility issues using the computer among said selected security features of said document;
   revising said selected security features of said document using said computer to resolve any compatibility issues;
   evaluating said relative rating information of said selected security features using said computer to determine a document security rating of said document; and
   presenting said document security rating of said document on a display of said computer.

2. The method of claim 1, further comprising presenting security features on a display of the computer for selection.

3. The method of claim 2, wherein said security features are presented categorized by purpose.

4. The method of claim 2, further comprising providing a selectable link for at least one said security feature, which when selected presents information which describes the associated security feature and explains strengths and weaknesses of the associated security feature.

5. The method of claim 1, further comprising recommending said security features based on security document type and desired security level.

6. The method of claim 5, further comprising providing a link for at least one of said security document type, which when selected presents an example of the associated security document type.

7. The method of claim 6, wherein said example includes recommended security features and providing associated links which when selected explain each associated security feature.

8. The method of claim 1, further comprising requesting document design information to help assess compatibility issues.

9. The method of claim 8, wherein said document design information includes use of security document, type of document paper, storage requirements, printer type, threat environment assessment, type of document tracking, type of document authentication, and type of document shipping.

10. The method of claim 8, wherein certain said security features are made unselectable by said computer based upon said document design information.

11. The method of claim 1, wherein said document security rating includes a rating of how well said selected security features will protect the security document against different forms of attack and relative ease of authentication of the security document.

12. The method of claim 11, wherein said different forms of attack include tampering, copying, counterfeiting, and accessing, and said rating is provided for each attack type.

13. The method of claim 11, wherein said authentication includes overt, covert, and mechanical, and said rating is provided for each authentication type.

14. The method of claim 1, wherein revising said selected security features of said document using said computer to resolve any compatibility issues comprises the steps of providing a warning with said computer, and suggesting at least two possible solutions with said computer for resolving said compatibility issue.

15. The method of claim 1, further comprising viewing a relative cost assessment for selected features.

16. The method of claim 1, further comprising presenting a link to common questions and concerns.

17. The method of claim 1, wherein said data relating to said selected security features is obtained from a database by said computer.

18. The method of claim 12, further comprising providing a protection disclaimer if said rating for at least one said attack type is deficient, and providing security feature suggestions that will provide the security document with adequate protection and performance in the specified attack type area.

19. The method of claim 13, further comprising providing a protection disclaimer if said rating for at least one said authentication type is deficient, and providing security feature suggestions that will provide the security document with adequate protection and performance in the specified authentication type area.

20. A non-transitory computer-readable medium with an executable program thereon, wherein the program instructs a processor of a computer system to perform evaluation of document security features that provide a level of security in a security document, said security features being provided directly on said security document, and rating the security level of said security document, the evaluation being carried out by the steps of:
   processing data relating to selected security features of said document using said computer system, said security features each having associated compatibility and relative rating information;
   determining compatibility issues using said computer system among said selected security features of said document; and
   evaluating said relative rating information of said selected security features using said computer system to determine a document security rating of said document; and
   presenting said document security rating of said document on a display of said computer system.

* * * * *